(12) United States Patent
Wang et al.

(10) Patent No.: US 12,399,686 B2
(45) Date of Patent: Aug. 26, 2025

(54) MULTIPLIER, MULTIPLY-ACCUMULATE CIRCUIT, AND CONVOLUTION OPERATION UNIT

(71) Applicant: SHENZHEN MICROBT ELECTRONICS TECHNOLOGY CO., LTD., Guangdong (CN)

(72) Inventors: Danyang Wang, Guangdong (CN); Shuangyan Chen, Guangdong (CN); Yun Zhai, Guangdong (CN); Zhijun Fan, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/846,855

(22) PCT Filed: Jun. 19, 2024

(86) PCT No.: PCT/CN2024/100056
§ 371 (c)(1),
(2) Date: Sep. 13, 2024

(87) PCT Pub. No.: WO2025/044421
PCT Pub. Date: Mar. 6, 2025

(65) Prior Publication Data
US 2025/0110697 A1    Apr. 3, 2025

(30) Foreign Application Priority Data
Aug. 28, 2023 (CN) .......... 202311088973.0

(51) Int. Cl.
*G06F 7/544* (2006.01)
*G06F 7/533* (2006.01)

(52) U.S. Cl.
CPC .......... *G06F 7/5443* (2013.01); *G06F 7/5334* (2013.01)

(58) Field of Classification Search
CPC ........ G06F 7/487; G06F 7/533; G06F 7/5306; G06F 7/5334; G06F 7/5336; G06F 7/5338; G06F 17/153; G06F 17/16
See application file for complete search history.

(56) References Cited

U.S. PATENT DOCUMENTS 4,864,529 A * 9/1989 Shah .................. G06F 7/5334
708/630
10,776,078 B1   9/2020 Clark et al.
(Continued)

FOREIGN PATENT DOCUMENTS

CN    103853524 A    6/2014
CN    107665126 A    2/2018
(Continued)

*Primary Examiner* — Emily E Larocque
(74) *Attorney, Agent, or Firm* — Dickinson Wright PLLC

(57) ABSTRACT

The present disclosure relates to a multiplier, a multiply-accumulate circuit, and a convolution operation unit. The multiplier includes: one or more selection circuits, each of the one or more selection circuits respectively configured to select a target preset multiple of a first operand from a preset multiple of a first operand as a fourth operand according to a corresponding third operand, wherein the target preset multiple is equal to a value of the third operand; and a partial product summing circuit, each of one or more input terminals of the partial product summing circuit respectively connected to an output terminal of corresponding one of at least one or more selection circuits, wherein the partial product summing circuit is configured to calculate a partial product sum of one or more fourth operands from the one or more selection circuits.

15 Claims, 6 Drawing Sheets

(56) References Cited

U.S. PATENT DOCUMENTS

2016/0358638 A1* 12/2016 Langhammer ............ G06F 1/10
2022/0004363 A1* 1/2022 Fujii ..................... G06F 7/5443

FOREIGN PATENT DOCUMENTS

| CN | 110659014 A | 1/2020 |
| CN | 116820387 A | 9/2023 |
| TW | 201017525 A | 5/2010 |

* cited by examiner

MULTIPLIER, MULTIPLY-ACCUMULATE CIRCUIT, AND CONVOLUTION OPERATION UNIT

CROSS-REFERENCE TO RELATED APPLICATIONS

This application is a national stage of International Application No. PCT/CN2024/100056 filed on Jun. 19, 2024, which claims priority to Chinese Patent Application No. 202311088973.0, filed on Aug. 28, 2023. Both of the aforementioned applications are hereby incorporated by reference in their entireties.

TECHNICAL FIELD

The present disclosure relates to the field of electronic circuit technology, and specifically, to a multiplier, a multiply-accumulate circuit, and a convolution operation unit.

BACKGROUND

The multiplier and the multiply-accumulate (Multiply and Accumulate, MAC) circuit may be used to complete multiply-accumulate operations such as multiplication of vectors, multiplication of matrixes, mutual multiplication of vector and matrix, and the like, and the multiplier and the MAC circuit are extremely important operation circuits in a processor. In particular, rapid development of artificial intelligence highlights an important role of a neural network processor, so that the neural network processor gradually becomes a cornerstone of intelligent computing technology. The convolution operation unit is a core unit of the neural network processor, and implementation of the convolution operation unit is inseparable from the multiply-accumulate operation performed by the multiplier and the multiply-accumulate circuit on activated data and weight data. Since the convolution operation unit is also a power consumption center of the neural network processor, a design of the multiplier and the multiply-accumulate circuit with low power consumption is extremely important to the convolution operation unit, and is also a key to large-scale applications of the neural network processor including the multiplier and the multiply-accumulate circuit.

SUMMARY

One of objectives of the present disclosure is to provide a multiplier, a multiply-accumulate circuit, and a convolution operation unit.

According to a first aspect of the present disclosure, a multiplier is provided, the multiplier is configured to perform a multiplication operation between a first operand and a second operand, wherein the second operand is divided into one or more third operands by bit, and the multiplier comprises one or more selection circuits and a partial product summing circuit. Each of the one or more selection circuits is respectively configured to select a target preset multiple of the first operand from a preset multiple of the first operand as a fourth operand according to a corresponding third operand, wherein the target preset multiple is equal to a value of the third operand; and each of one or more input terminals of the partial product summing circuit is respectively connected to an output terminal of corresponding one of at least one or more selection circuits, and the partial product summing circuit is configured to calculate a partial product sum of one or more fourth operands from the one or more selection circuits.

In some embodiments, the selection circuit comprises a multiplexer. The multiplexer comprises a plurality of input terminals, a control terminal, and an output terminal. Each of the plurality of input terminals is respectively configured to receive a corresponding preset multiple of the first operand. The control terminal is configured to receive the third operand, and the output terminal is configured to output the fourth operand.

In some embodiments, the selection circuit comprises a plurality of AND operation units and one OR operation unit. The plurality of AND operation units are disposed in parallel. An output terminal of each AND operation unit is connected to an input terminal of the OR operation unit, and two input terminals of each of the plurality of AND operation units are respectively configured to receive the corresponding preset multiple of the first operand and the third operand. The OR operation unit is configured to output the fourth operand.

In some embodiments, the partial product summing circuit comprises a first compression tree circuit. Each of a plurality of input terminals of the first compression tree circuit is respectively connected to an output terminal of one corresponding selection circuit, and the first compression tree circuit is configured to compress a plurality of fourth operands from a plurality of selection circuits into a plurality of fifth operands. A number of the plurality of fifth operands is less than that of the plurality of fourth operands.

In some embodiments, the multiplier further comprises one or more multiple calculation circuits. Each of the one or more multiple calculation circuits is respectively configured to calculate a corresponding preset multiple of an operand.

In some embodiments, the multiple calculation circuit comprises an even multiple calculation circuit. The even multiple calculation circuit comprises a first shifter, and the first shifter is configured to move an intermediate operand to left by one bit to generate an even multiple of an initial operand. The intermediate operand is an integer multiple of the initial operand.

In some embodiments, the multiple calculation circuit comprises an odd multiple calculation circuit. The odd multiple calculation circuit comprises a second shifter and a third adder. The second shifter is configured to move an intermediate operand to left by one bit to generate two multiple of the intermediate operand, and the third adder is configured to add the two multiple of the intermediate operand and an initial operand to generate an odd multiple of the initial operand. The intermediate operand is an integer multiple of the initial operand.

In some embodiments, a number of selection circuits in the multiplier is a minimum integer greater than or equal to B20/B30, and the one or more selection circuits are respectively configured to receive the one or more third operands in parallel, wherein B20 is a maximum bit number of the second operand and B30 is a maximum bit number of the third operand.

In some embodiments, the preset multiple of the first operand comprises all integer multiples of the first operand in a range from zero multiple of the first operand to M0 multiple of the first operand, wherein $M0=2^{B3}-1$, and B3 is a bit number of the third operand that is input to a same selection circuit with the preset multiple of the first operand.

In some embodiments, each of the one or more third operands has a same bit number.

In some embodiments, a bit number of at least one of the one or more third operands is at least two bits.

According to a second aspect of the present disclosure, a multiply-accumulate circuit is provided, comprising one or more multipliers as described above and an accumulative summing circuit. An input terminal of the accumulative summing circuit is respectively connected to an output terminal of corresponding one of the one or more multipliers, and the accumulative summing circuit is configured to calculate an accumulative sum of products between one or more sets of the first operands and the second operands according to one or more outputs from the one or more multipliers.

In some embodiments, the accumulative summing circuit comprises a second compression tree circuit and a first adder. Each of a plurality of input terminals of the second compression tree circuit is respectively connected to an output terminal of one corresponding multiplier, and the second compression tree circuit is configured to compress a plurality of sixth operands from a plurality of multipliers into a plurality of seventh operands. A number of the plurality of sixth operands is less than that of the plurality of seventh operands; and an input terminal of the first adder is connected to an output terminal of the second compression tree circuit, and the first adder is configured to calculate a sum of the plurality of seventh operands.

In some embodiments, the accumulative summing circuit further comprises a second adder and a register. A first input terminal of the second adder is connected to an output terminal of the first adder; and an input terminal of the register is connected to an output terminal of the second adder. An output terminal of the register is connected to a second input terminal of the second adder, and the register is configured to return a sum from the second adder to the second adder, so that the second adder performs an accumulative operation.

According to a third aspect of the present disclosure, a convolution operation unit is provided, comprising a plurality of multiply-accumulate circuits as described above.

In some embodiments, each of the plurality of multiply-accumulate circuits is configured to receive at least one preset multiple of the first operand to perform a multiply-accumulate operation.

According to a fourth aspect of the present disclosure, a processor is provided, comprising the multiplier as described above, or the multiply-accumulate circuit as described above, or the convolution operation unit as described above.

According to a fifth aspect of the present disclosure, a calculation apparatus is provided, comprising the multiplier as described above, or the multiply-accumulate circuit as described above, or the convolution operation unit as described above, or the processor as described above.

Other features and advantages of the present disclosure will become more apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the present disclosure and together with the specification, serve to explain principles of the present disclosure.

The present disclosure can be more clearly understood from the following detailed description taken with reference to the accompanying drawings, in which.

Figure 1:
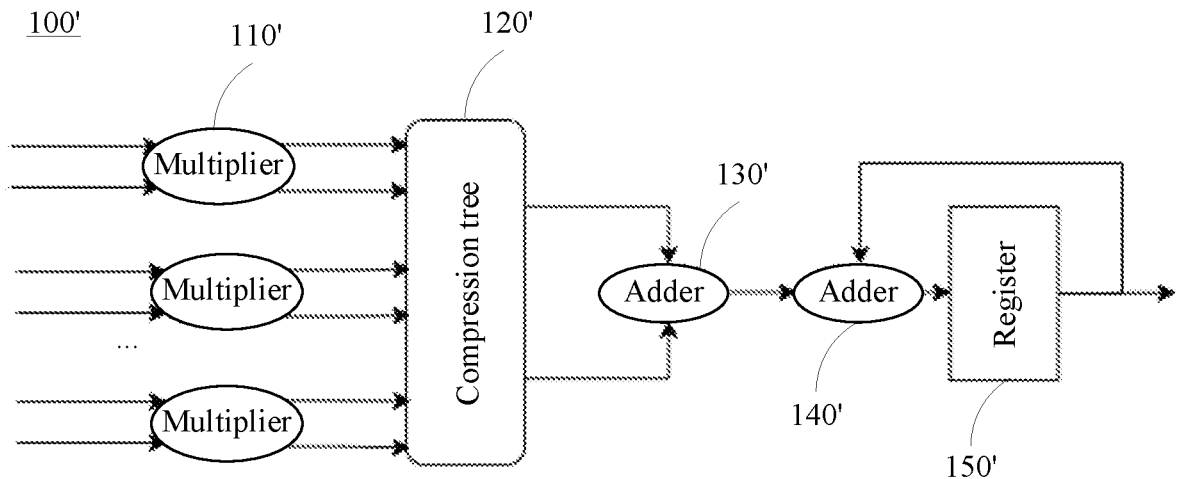
FIG. 1 shows a circuit structural schematic diagram of a multiply-accumulate circuit.

Note that in the embodiments illustrated below, a same reference numeral is shared among different drawings to denote a same portion or portion having a same function sometimes, and a duplicated description thereof is omitted. In the specification, similar reference numbers and letters are used to denote similar items, and thus, once a certain item is defined in one drawing, it does not need to be further discussed in subsequent drawings.

For ease of understanding, positions, dimensions, ranges, and the like of structures shown in the drawings and the like sometimes do not indicate actual positions, dimensions, ranges, and the like. Therefore, the disclosed invention is not limited to the locations, the sizes, the scopes, and the like disclosed in the accompanying drawings or the like. Moreover, the accompanying drawings are not necessarily drawn to scale, and some features may be enlarged to show details of specific components.

DETAILED DESCRIPTION

Various exemplary embodiments of the present disclosure are described in detail with reference to the accompanying drawings below. It is to be noted that, unless otherwise illustrated specifically, relative arrangement of components and steps, numerical expressions, and values stated in these embodiments do not limit the scope of the present disclosure.

Practically, the following descriptions of at least one exemplary embodiment are merely illustrative, and in no way constitute any limitation on the present disclosure and the application or use thereof. In other words, the structure and the method herein are shown in an exemplary manner to illustrate different embodiments of the structure and the method in the present disclosure. However, a person skilled in the art will understand that they merely illustrate exemplary rather than exhaustive manners in which the present disclosure may be implemented. Moreover, the accompanying drawings are not necessarily drawn to scale, and some features may be enlarged to show details of specific components.

In addition, a technology, a method, and a device known to a person of ordinary skill in the related art may not be discussed in detail, but in proper circumstances, said technology, method, and device shall be regarded as a part of the specification.

In all examples that are shown and discussed herein, any specific value should be interpreted only as an example but not as a limitation. Therefore, there may be different values in other examples of the exemplary embodiments.

In the convolutional neural network, a large quantity of convolution operations are involved, wherein the convolution Co(n) may be represented as: $Co(n)=\Sigma_{i=0}^{k}Cin(n, i)\times Din(i)$. It can be seen that the convolution operation contains a large quantity of multiply-accumulate operations. Therefore, the multiplier used to implement the multiplication operation becomes a main component of the convolution operation unit, and the adder used to implement the addition operation can be simplified as a series of compression circuits.

As shown in FIG. 1, the multiply-accumulate circuit 100' may include the multiplier 110', the compression tree 120', the first adder 130', the second adder 140', and the register 150'.

Each multiplier 110' may be configured to calculate a product of one set of a multiplicand and a multiplicator each time. In a specific example shown in FIG. 1, the multiplier 110' may output two partial products generated according to the multiplicand and the multiplicator, and based on these two partial products, the product of the multiplicand and the multiplicator may be further obtained. It may be understood that, in some embodiments, the multiplier 110' may include a compression tree (not shown in the figures) therein to compress a plurality of partial products generated according to the multiplicand and the multiplicator into two partial products for output.

As shown in FIG. 1, each output terminal of a plurality of multipliers 110' may be respectively connected to a corresponding input terminal of the compression tree 120'. As such, the compression tree 120' may compress a plurality of partial products from the plurality of multipliers 110' (here, the number of the partial products may be two multiple of the number of the multipliers 110') into two partial products, and the two compressed partial products may be output to the first adder 130'.

Further, the first adder 130' may be used to calculate a sum of the two partial products generated by the compression tree 120', thereby obtaining a sum of a plurality of products of a plurality of multipliers 110' connected to the compression tree 120'.

Then, the sum of the plurality of products from the first adder 130' may be provided to the register 150' via the second adder 140' and be temporarily stored in the register 150'.

In the next operation process, a plurality of new sets of multiplicands and multiplicators may be respectively input to corresponding multipliers 110', and the operation process described above is repeated to obtain a sum of the products among the plurality of new sets of the multiplicands and the multiplicators. Then, the sum of the products previously temporarily stored in the register 150' and the sum of the products obtained in this operation process may be added by the second adder 140', and the sum of the products obtained by adding may be temporarily stored in the register 150', until all the multiply-accumulate operations are completed.

Figure 2:
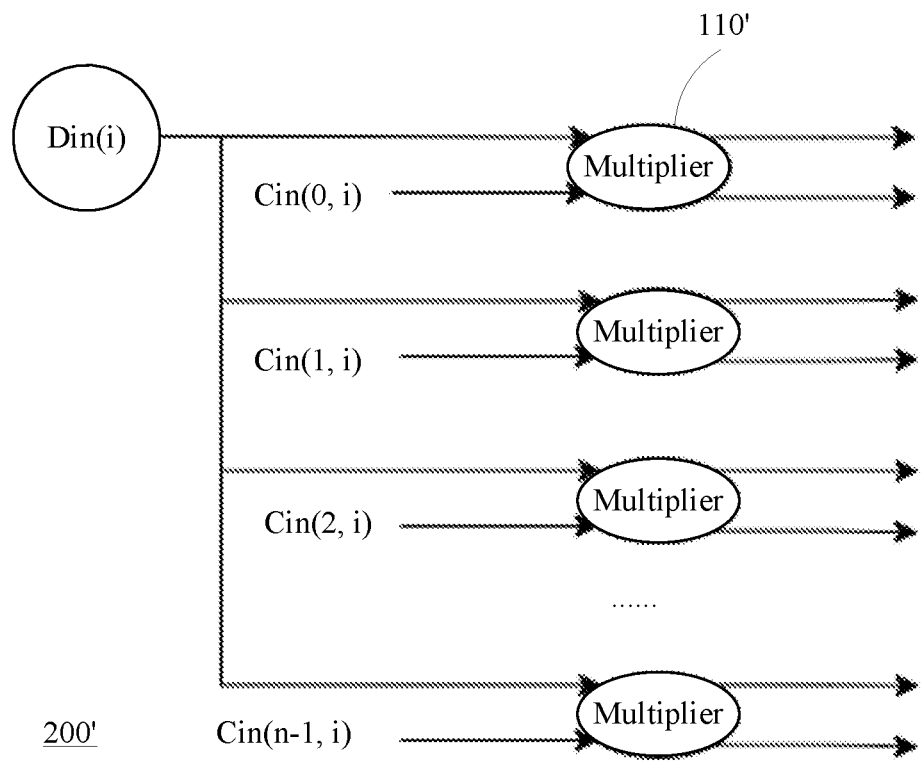
FIG. 2 shows a partial circuit structural schematic diagram of a convolution operation unit.

In addition, as shown in FIG. 2, in order to complete the convolution operation more efficiently, a plurality of multiply-accumulate circuits 100' as shown in FIG. 1 may be provided to form the convolution operation unit 200'. It should be noted that, for sake of brevity and clarity of the figures, each multiplier 110' in FIG. 2 corresponds to one multiplier in a different multiply-accumulate circuit 100' respectively, and components such as other multipliers, the compression tree, the first adder, the second adder, the register, and the like in the multiply-accumulate circuit 100' are omitted. The plurality of multiply-accumulate circuits 100' in the convolution operation unit 200' may run in parallel to improve the operation efficiency. Specifically, as shown in the above convolution formula, a same Din(i) will be multiplied by a plurality of different Cin(n, i)s respectively, so as to calculate Co(n)s in cases of different values of n. Correspondingly, each multiply-accumulate circuit 100' may be respectively used to calculate Co(n) in a case of different value of n. As such, a same Din(i) may be input to corresponding multipliers 110' in the plurality of multiply-accumulate circuits 100', that is, such a convolution operation unit has a feature of single-driving-multiple.

In a specific example, assuming that a value of k is 1024, the convolution formula described above may be expanded as Co(n)=Cin(n,0)*Din(0)+Cin(n,1)*Din(1)+ . . . +Cin(n, 1023)*Din(1023). Further, considering different values of n, the formula described above may be further split into a series of parallel formulas as shown below:

$Co(0) =$ $\quad Cin(0, 0) * Din(0) + Cin(0, 1) * Din(1) + \ldots + Cin(0, 1023) * Din(1023);$ $Co(1) =$ $\quad Cin(1, 0) * Din(0) + Cin(1, 1) * Din(1) + \ldots + Cin(1, 1023) * Din(1023);$ $\ldots$ $Co(n-1) = Cin(n-1, 0)Din(0) +$ $\quad Cin(n-1, 1) * Din(1) + \ldots + Cin(n-1, 1023) * Din(1023).$ When the convolution operation described above is performed based on the multiply-accumulate circuit shown in FIG. 1 and the convolution operation unit shown in FIG. 2, a problem of parallelism degree may be considered. For example, the parallelism degree of each multiply-accumulate circuit 100' may be 16, that is, the compression tree 120' may be connected to 16 multipliers 110'. In addition, each multiply-accumulate circuit 100' in the convolution operation unit 200' may be respectively used to calculate the value of Co(n) in a case of a corresponding value of n. The following takes the operation process of Co(0) as an example for detailed description.

In the first operation period, 16 multipliers 110' in the multiply-accumulate circuit 100' used to calculate Co(0) in the convolution operation unit 200' respectively calculate Cin(0,0)*Din(0), Cin(0,1)*Din(1), . . . , Cin(0,15)*Din(15). A total of 32 partial products generated by the 16 multipliers 110' described above are input into the compression tree 120', and then the sum of Cin(0,0)*Din(0)+Cin(0,1)*Din (1)+ . . . +Cin(0,15)*Din(15) may be obtained by the calculation of the first adder 130'. This sum may be input to the register 150' via the second adder 140' and be temporarily stored in the register 150'.

In the second operation period, the 16 multipliers 110' described above respectively calculate Cin(0,16)*Din(16), Cin(0,17)*Din(17), . . . , Cin(0,31)*Din(31). Similarly, a total of 32 partial products generated by the 16 multipliers 110' are input into the compression tree 120', and then the sum of Cin(0,16)*Din(16)+Cin(0,17)*Din(17)+ . . . +Cin(0, 31)*Din(31) may be obtained by the calculation of the first adder 130'. This sum calculated by the first adder 130' and the sum of the products of the first 16 sets of numbers that is previously temporarily stored in the register 150' may be added by the second adder 140', thereby obtaining the sum of the products of the first 32 sets of numbers, and the sum newly calculated by the second adder 140' may be temporarily stored in the register 150'.

The operations described above are repeated similarly, as such, the sum of the products of all 1024 sets of numbers may be obtained after a total of 64 operation periods, that is, the value of Co(0) is obtained in the case of n=0.

It may be understood that when the values of n are 1, 2, . . . , and n−1, the values of Co(1), Co(2), . . . , and Co(n−1) may be respectively calculated by other corresponding multiply-accumulate circuits 100' in the convolution operation unit 200' in the manner as described above, so as to obtain the complete convolution operation result.

It may be learned from the above description that a large quantity of multipliers need to be utilized in the foregoing multiply-accumulate circuit or convolution operation unit, and usage of a large quantity of conventional multipliers will bring the problems of the large chip area, the high power consumption, and the like. To resolve the problems described above, the present disclosure proposes an optimized design of the multiplier or the array multiplier, wherein the structure of the multiplier is simplified based on a selection circuit, thereby decreasing the chip area and reducing the operating power consumption.

Figure 3:
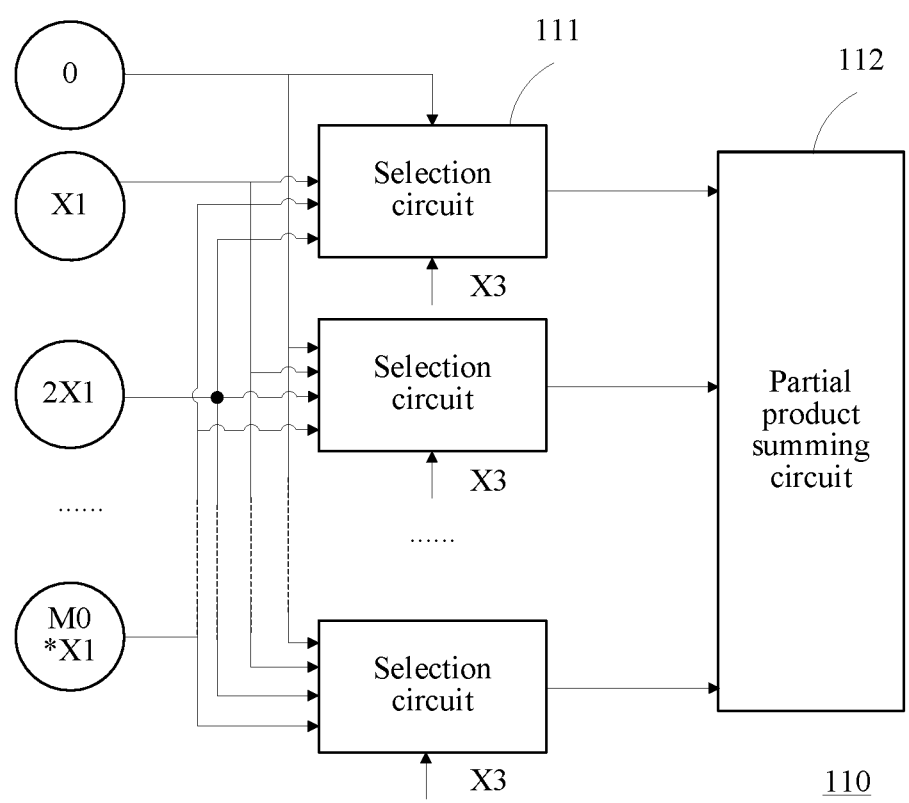
FIG. 3 shows a structural schematic diagram of a multiplier according to an exemplary embodiment of the present disclosure.

In an exemplary embodiment of the present disclosure, as shown in FIG. 3, the multiplier 110 used to perform the multiplication operation between the first operand X1 and the second operand X2 may include one or more selection circuits 111 and a partial product summing circuit 112. Herein, the second operand X2 may be divided into one or more third operands X3 by bit to participate in the operation. It should be noted that, in FIG. 3, the third operands X3 input to different selection circuits 111 are respectively corresponding to different bit portions of the second operand X2. Therefore, a plurality of third operands X3 shown in FIG. 3 may be different from each other.

Each selection circuit 111 may be respectively configured to select the target preset multiple of the first operand from the preset multiple of the first operand as the fourth operand according to the corresponding third operand X3. The target preset multiple may be equal to the value of the third operand X3 described above. In other words, the fourth operand selected by the selection circuit 111 is the partial product between the first operand X1 and the third operand X3 described above.

In a specific example, the bit number of the third operand X3 may be two bits. In this case, the selection circuit 111 will perform selection in the following four preset multiples of the first operand in total. Specifically, in a case in which the third operand X3 is 00, the selection circuit 111 may select zero multiple of the first operand (i.e., 0) as the fourth operand; in a case in which the third operand is 01, the selection circuit 111 may select the first operand itself (i.e., X1) as the fourth operand; in a case in which the third operand is 10, the selection circuit 111 may select two multiple of the first operand (i.e., 2X1) as the fourth operand; and; and in a case in which the third operand is 11, the selection circuit 111 may select three multiple of the first operand (i.e., 3X1) as the fourth operand. Herein, each multiple of the first operand may be pre-calculated to be input to the selection circuit 111, so as to reduce the unnecessary repeated calculation.

In another specific example, the bit number of the third operand X3 may be three bits. In this case, the selection circuit 111 will perform selection in the following eight preset multiples of the first operand in total. In particular, in a case in which the third operand X3 is 000, the selection circuit 111 may select zero multiple of the first operand (i.e., 0) as the fourth operand; in a case in which the third operand is 001, the selection circuit 111 may select the first operand itself (i.e., X1) as the fourth operand; in a case in which the third operand is 010, the selection circuit 111 may select two multiple of the first operand (i.e., 2X1) as the fourth operand; in a case in which the third operand is 011, the selection circuit 111 may select three multiple of the first operand (i.e., 3X1) as the fourth operand; in a case in which the third operand X3 is 100, the selection circuit 111 may select four multiple of the first operand (i.e., 4X1) as the fourth operand; in a case in which the third operand is 101, the selection circuit 111 may select five multiple of the first operand (i.e., 5X1) as the fourth operand; in a case in which the third operand is 110, the selection circuit 111 may select six multiple of the first operand (i.e., 6X1) as the fourth operand; and in a case in which the third operand is 111, the selection circuit 111 may select seven multiple of the first operand (i.e., 7X1) as the fourth operand. Similarly, each multiple of the first operand may be pre-calculated to be input to the selection circuit 111, so as to reduce the unnecessary repeated calculation.

By analogy, the third operand X3 may have another bit number. Correspondingly, the preset multiples of the first operand may include all integer multiples of the first operand in a range from zero multiple of the first operand to M0 multiple of the first operand, wherein $M0=2^{B3}-1$, and B3 is the bit number of the third operand that is input to a same selection circuit with the preset multiple of the first operand. Depending on the quantitative relation between the bit number of the second operand X2 and the bit number of the third operand X3, in some embodiments, each of one or more third operands X3 divided from the second operand X2 may have the same bit number. For example, in a case of the second operand X2=1001010100, the following listed third operands X3 that each has two bits may be obtained through division: 10, 01, 01, 01, and 00. Correspondingly, each selection circuit 111 may receive 0, the first operand, two multiple of the first operand, and three multiple of the first operand for selection. In some other embodiments, the bit number of the second operand may not be divisible by an expected bit number of the third operand. In this case, there may be at least one third operand with a different bit number from that of another third operand. For example, in a case of the second operand X2=10010101001, the following listed third operands X3 may be obtained through division: 10, 010, 101, and 001. In this case, for the corresponding third operand respectively, the corresponding preset multiples of the first operand may be input into the selection circuit 111 for selection. For example, the selection circuit 111 receiving the third operand 10 may receive all integer multiples of the first operand in a range from zero multiple of the first operand to three multiple of the first operand, while the selection circuits 111 receiving the third operands 010, 101, and 001 may receive all integer multiples of the first operand in a range from zero multiple of the first operand to seven multiple of the first operand. Alternatively, in some embodiments, the selection circuit 111 receiving the third operand 10 may also receive all integer multiples of the first operand in a range from zero multiple of the first operand to seven multiple of the first operand, that is, all the selection circuits in the multiplier determine the preset multiples of the first operand to be received according to the maximum bit number of the third operands. Just in the selection circuit 111 receiving the third operand 10, the fourth operand finally selected correctly can only be a certain integer multiple of the first operand in a range from zero multiple of the first operand to three multiple of the first operand.

It may be understood that, as the bit number of the third operand increases, the number of various preset multiples of the first operand need to be pre-calculated increases correspondingly, which may bring a certain increase in the operation amount. However, at the same time, the number of the third operands obtained by dividing the second operand may decrease, which may help reduce the number of the selection circuits required in the multiplier. It can be seen that a reasonable bit number of the third operand can be selected as desired. In some embodiments, the bit number of at least one of the one or more third operands is at least two bits. That is, the partial product between at least two bits of the second operand and the first operand may be obtained at a time by the selection circuit, thereby reducing the number of operations required for calculating the partial products, and reducing the number of the partial products need to be summed, and the selection circuit has a relatively simple circuit structure, thereby helping decrease the chip area and reduce the power consumption.

In some embodiments, the number of the selection circuits 111 required in the multiplier 110 may be determined based on the quantitative relation between the bit number of the second operand X2 and the bit number of the third operand X3. For example, a plurality of selection circuits 111 in the multiplier 110 may process, in parallel, the partial product selections associated with one or more third operands X3 divided from the second operand X2, so as to improve the efficiency of the multiplication operation. In this case, the number of the selection circuits 111 in the multiplier 110 may be the minimum integer greater than or equal to B20/B30 (that is, the value obtained by dividing B20 by B30), and the one or more selection circuits 111 are respectively configured to receive one or more third operands in parallel, wherein B20 is the maximum bit number of the second operand and B30 is the maximum bit number of the third operand. Then, the fourth operands selected by all the selection circuits 111 may be input into the partial product summing circuit 112 for further calculation. For example, if the maximum bit number of the second operand is 32 bits and the maximum bit number of the third operand is 2 bits, the multiplier 110 may include a total of 16 selection circuits 111 to perform the partial product selections in parallel. Alternatively, if the maximum bit number of the second operand is 32 bits and the maximum bit number of the third operand is 3 bits, the multiplier 110 may include a total of 11 selection circuits 111 to perform the partial product selections in parallel.

Alternatively, in some other embodiments, the number of the selection circuits 111 included in the multiplier 110 may be appropriately reduced, and instead, different sets of the third operands and the preset multiples of the first operand may be serially input to obtain all the required partial products, that is, at least one selection circuit 111 may be used to serially calculate the partial products between the first operand and the plurality of third operands. In this manner, the number of the required selection circuits 111 may be reduced, but at the same time, it may lead the increase of the multiplication operation duration and the reduction of the efficiency.

Figure 4:
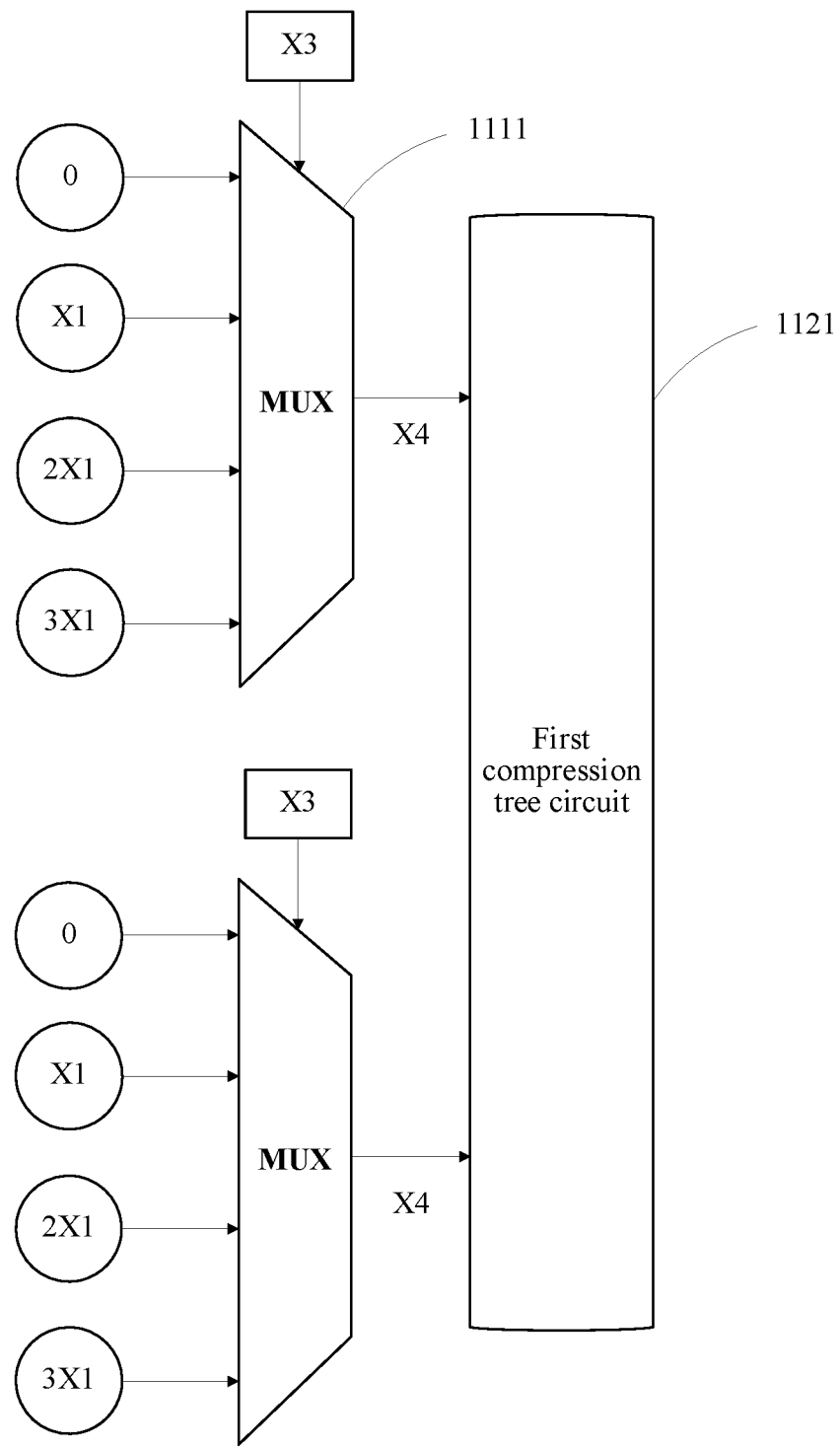
FIG. 4 shows a circuit structural schematic diagram of a multiplier according to a specific embodiment of the present disclosure.

In some embodiments, as shown in FIG. 4, the selection circuit 111 may include the multiplexer (MUX) 1111, and the multiplexer 1111 may include a plurality of input terminals, a control terminal, and an output terminal. Each of the plurality of input terminals may be respectively configured to receive the corresponding preset multiple of the first operand. In a specific example shown in FIG. 4, 0, X1, 2X1, and 3X1 are respectively received. The control terminal may be configured to receive the corresponding third operand. As described above, the control terminals of different multiplexers 1111 may respectively receive the third operands X3 corresponding to different portions of the second operand X2. The output terminal may be configured to output the fourth operand X4. As described above, the output fourth operand X4 is the target preset multiple of the first operand selected from the preset multiples of the first operand according to the third operand X3 received by the control terminal of the multiplexer 1111.

Figure 5A:
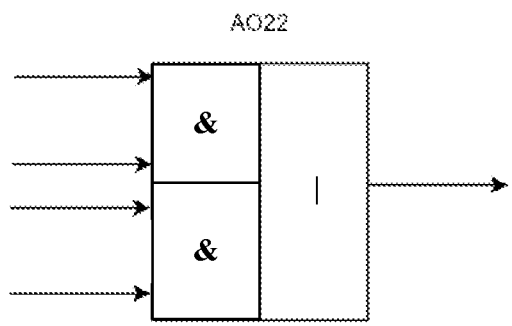
FIG. 5(a) shows a circuit structural schematic diagram of an AO22 module in a multiplier according to another specific embodiment of the present disclosure.
Figure 5B:
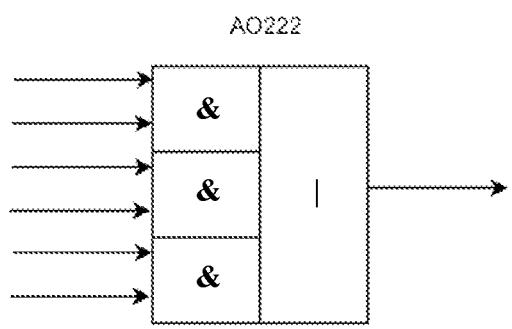
FIG. 5(b) shows a circuit structural schematic diagram of an AO222 module in a multiplier according to still another specific embodiment of the present disclosure.

In some other embodiments, as shown in FIGS. 5(*a*) and 5(*b*), the AO22 module, the AO222 module or the like may be alternatively used to replace the multiplexer to form the selection circuit 111. For example, the AO22 module may be used to replace the two-input multiplexer, while the AO222 module may be used to replace the three-input multiplexer, and so on. Specifically, for example, the selection circuit such as the AO22 module, the AO222 module or the like may logically include a plurality of AND (&) operation units and one OR (|) operation unit. The AO22 module shown in FIG. 5(*a*) may include two AND operation units, while the AO222 module shown in FIG. 5(*b*) may include three AND operation units. The plurality of AND operation units are disposed in parallel, the output terminal of each AND operation unit is connected to the input terminal of the OR operation unit, and two input terminals of each of the plurality of AND operation units may be respectively configured to receive the corresponding preset multiple of the first operand and the third operand, and to calculate the AND operation result between the preset multiple of the first operand and the third operand. The OR operation unit may be configured to calculate the OR operation result among a plurality of AND operation results from the plurality of AND operation units, wherein the OR operation result may be output as the fourth operand, that is, the target preset multiple of the first operand selected according to the third operand.

Returning to FIG. 3, each of the one or more input terminals of the partial product summing circuit 112 may be respectively connected to the output terminal of the corresponding selection circuit 111, and the partial product summing circuit 112 may be configured to calculate a partial product sum of one or more fourth operands from the one or more selection circuits 111. It should be noted that in this text, based on the principle of the multiplication operation, the partial product sum refers to a sum generated by taking into account a relative shift that needs to be performed among the partial products, and not necessarily a direct sum of the plurality of partial products. For example, it is assumed that the partial product of the third operand X3 corresponding to the low 0-1 bits of the second operand X2 and the first operand X1 is pm1, and the partial product of the third operand X3 corresponding to the low 2-3 bits of the second operand X2 and the first operand X1 is pm2, then when the partial product sum of pm1 and pm2 is calculated, firstly pm2 needs to be moved to left by two bits, and then the sum is calculated according to the corresponding bits, so as to obtain a correct multiplication operation result. In various compression tree circuits mentioned later, the above alignment or shift among the partial products may be automatically processed as required to obtain a correct partial product sum, and thus it will not be described in detail. In some embodiments, the output of the partial product summing circuit 112 may alternatively be a partial product, such as two or three partial products compression processed, to be further calculated. In some other embodiments, the output of the partial product summing circuit 112 may be the product between the first operand and the second operand, that is, the final operation result of multiplication is output. It can be learned that a required partial product summing circuit 112 may be disposed as desired.

In some embodiments, as shown in FIG. 4, the partial product summing circuit 112 may include the first compression tree circuit 1121. Each of a plurality of input terminals of the first compression tree circuit 1121 may be respectively connected to the output terminal of one corresponding selection circuit 111, and the first compression tree circuit 1121 may be configured to compress a plurality of fourth operands from the plurality of selection circuits into a plurality of fifth operands. It may be learned from the principle of the compression tree circuit that a partial product sum of the plurality of fourth operands may be equal to a sum, a weighted sum, or a partial product sum of the plurality of fifth operands. In addition, the number of the plurality of fifth operands may be less than that of the plurality of fourth operands, that is, the compression tree circuit may reduce the number of the partial products, so as to facilitate further processing. The first compression tree circuit 1121 may be formed by an existing or to-be-developed compression tree circuit, and the common compression tree may include the compression tree with two output terminals such as the 4:2 compression tree, the 3:2 compression tree, and the like; the common compression tree may further include the compression tree with three output terminals such as the 5:3 compression tree, the 6:3 compression tree, the 7:3 compression tree, and the like. Alternatively, the first compression tree circuit 1121 may be formed by cascading a plurality of levels of compression trees. In addition, as described above, the first compression tree circuit 1121 may automatically perform the alignment among the corresponding bits of the partial products in the operation process, so as to obtain the correct operation result.

It may be understood that in some embodiments, the partial product summing circuit 112 may further include an adder (not shown in the figures), and each input terminal of the adder may be respectively connected to a corresponding output terminal of the first compression tree circuit 1121 to calculate the sum of the plurality of partial products from the first compression tree circuit 1121, so as to obtain the product between the first operand the second operand.

In some embodiments, to provide the preset multiple of the first operand to be selected, the multiplier may further include one or more multiple calculation circuits, and each of the one or more multiple calculation circuits may be respectively configured to calculate a corresponding preset multiple of an operand. It may be understood that an output terminal of the multiple calculation circuit may be connected to a corresponding input terminal of each of one or more selection circuits 111, so as to provide the corresponding preset multiple of the first operand.

Figure 6:
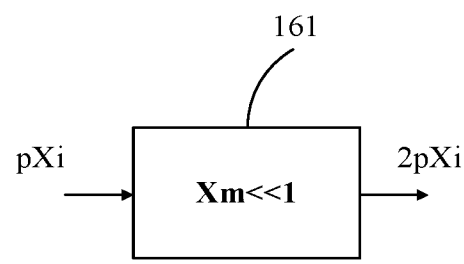
FIG. 6 shows a circuit structural schematic diagram of an even multiple calculation circuit in a multiplier according to a specific embodiment of the present disclosure.

In some embodiments, as shown in FIG. 6, the multiple calculation circuit may include an even multiple calculation circuit. The even multiple calculation circuit may include a first shifter 161. The first shifter 161 may be configured to move an intermediate operand Xm to left by one bit to generate an even multiple of an initial operand Xi. The intermediate operand Xm is an integer multiple of the initial operand Xi, for example, p multiple of the initial operand Xi as shown in FIG. 6. In some embodiments, the even multiple calculation circuit may alternatively include two or more shifters to generate four multiple of the first operand, eight multiple of the first operand, sixteen multiple of the first operand, and the like. In addition, the even multiple calculation circuit may further be used in conjunction with an odd multiple calculation circuit described below to generate six multiple of the first operand, ten multiple of the first operand, fourteen multiple of the first operand, and the like.

Figure 7:
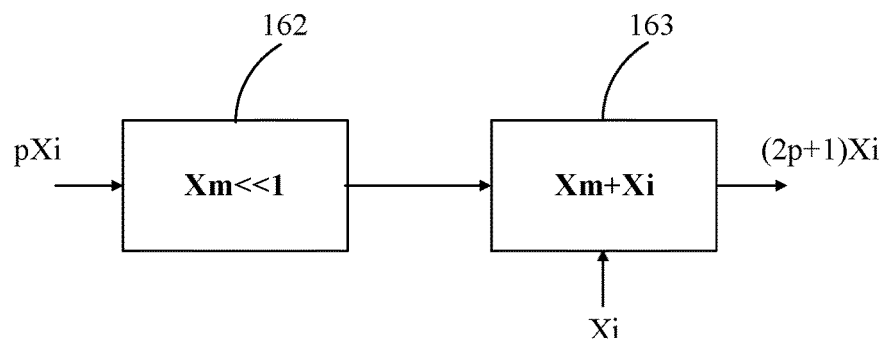
FIG. 7 shows a circuit structural schematic diagram of an odd multiple calculation circuit in a multiplier according to a specific embodiment of the present disclosure.

In some embodiments, as shown in FIG. 7, the multiple calculation circuit may include an odd multiple calculation circuit. The odd multiple calculation circuit may include a second shifter 162 and a third adder 163. The second shifter 162 may be configured to move the intermediate operand Xm to left by one bit to generate two multiple of the intermediate operand, and the third adder 163 may be configured to add the two multiple of the intermediate operand 2Xm and the initial operand Xi to generate an odd multiple of the initial operand $(2p+1)$ Xi, wherein the intermediate operand Xm is an integer multiple of the initial operand Xi, for example, p times the initial operand Xi as shown in FIG. 7. In a specific example, the odd multiple calculation circuit may include a three multiple calculation circuit. The three multiple calculation circuit may include the second shifter and the third adder. The second shifter may be configured to move the first operand to left by one bit to generate two multiple of the first operand. The third adder may be configured to add the two multiple of the first operand and the first operand to generate three multiple of the first operand (i.e., $3X1=X1+X1<<1$). In another specific example, the odd multiple calculation circuit may further include a five multiple calculation circuit, a seven multiple calculation circuit, and the like. The five multiple calculation circuit may include the second shifter and the third adder. The second shifter may be configured to move two multiple of the first operand to left by one bit to generate four multiple of the first operand. The third adder may be configured to add the four multiple of the first operand and the first operand to generate five multiple of the first operand (i.e., $5X1=X1+2X1<<1$). The seven multiple calculation circuit may include the second shifter and the third adder, the second shifter may be configured to move three multiple of the first operand to left by one bit to generate six multiple of the first operand, and the third adder may be configured to add the six multiple of the first operand and the first operand to generate seven multiple of the first operand (i.e., $7X1=X1+3X1<<1$). Similarly, more odd multiple calculation circuits may be provided as desired to pre-calculate a corresponding odd multiple of the first operand.

As described above, by providing, for example, the multiple calculation circuit to pre-calculate at least one preset multiple of the first operand, repeatedly calculating the preset multiple of the first operand in each partial product operation process may be effectively avoided, thereby helping improve the multiplication operation efficiency and simplify the circuit structure of the multiplier.

Figure 8:
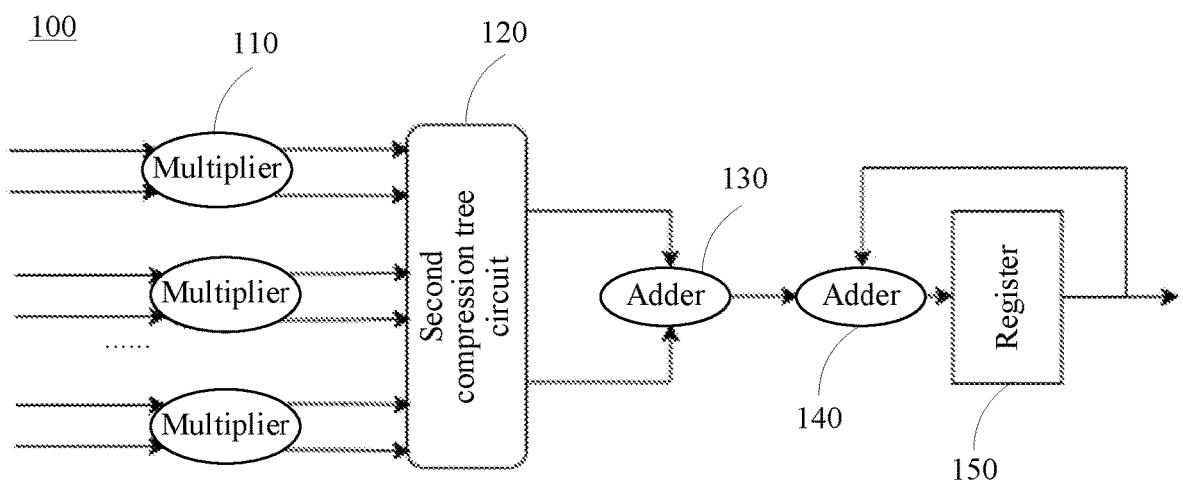
FIG. 8 shows a circuit structural schematic diagram of a multiply-accumulate circuit according to an exemplary embodiment of the present disclosure.

As shown in FIG. 8, the present disclosure further proposes a multiply-accumulate circuit 100, which may include one or more multipliers 110 as described above and an accumulative summing circuit. An input terminal of the accumulative summing circuit may be respectively connected to an output terminal of a corresponding multiplier 110, and the accumulative summing circuit may be configured to calculate the accumulative sum of the products between one or more sets of the first operands and the second operands according to one or more outputs from the one or more multipliers 110. In some embodiments, the accumulative summing circuit in the multiply-accumulate circuit 100 may perform the multiply-accumulate operation in a manner similar to that shown in FIG. 1. However, it may be understood that the desired accumulative summing operation may be implemented using another circuit structure as desired, which is not limited herein.

In some embodiments, as shown in FIG. 8, the accumulative summing circuit may include a second compression tree circuit 120 and a first adder 130. Each of a plurality of input terminals of the second compression tree circuit 120 may be respectively connected to an output terminal of a corresponding multiplier 110, and the second compression tree circuit 120 may be configured to compress a plurality of sixth operands from the plurality of multipliers into a plurality of seventh operands. As described above, it may be learned from the principle of the compression tree circuit that a partial product sum of the plurality of sixth operands may be equal to a sum, a weighted sum, or a partial product sum of the plurality of seventh operands. In addition, the number of the plurality of sixth operands may be less than that of the plurality of seventh operands, that is, the compression tree circuit may reduce the number of the partial products, so as to facilitate further processing. The second compression tree circuit 120 may be formed by an existing or to-be-developed compression tree circuit, and the common compression tree may include the compression tree with two output terminals such as the 4:2 compression tree, the 3:2 compression tree, and the like; the common compression tree may further include the compression tree with three output terminals such as the 5:3 compression tree, the 6:3 compression tree, the 7:3 compression tree, and the like. Alternatively, the second compression tree circuit 120 may be formed by cascading a plurality of levels of compression trees. In addition, as described above, the second compression tree circuit 120 may automatically perform the alignment among the corresponding bits of the partial products in the operation process, so as to obtain the correct operation result. Further, in a case in which the multipliers 110 are directly connected to the second compression tree circuit 120, the plurality of sixth operands herein may be the plurality of fifth operands output by corresponding multipliers 110. However, it may be understood that some other required processing may also be applied to the plurality of fifth operands, which may lead to existence of a difference between the plurality of sixth operands input to the second compression tree circuit 120 and the plurality of fifth operands output by the multipliers 110. Herein, a specific operation manner of the second compression tree circuit 120 is similar to that of the compression tree 120' described with respect to FIG. 1, and details are not described again.

The input terminal of the first adder 130 may be connected to the output terminal of the second compression tree circuit 120, and the first adder 130 may be configured to calculate the sum of the plurality of seventh operands. Herein, a specific operation manner of the first adder 130 is similar to that of the first adder 130' described with respect to FIG. 1, and details are not described again.

Further, in some embodiments, the accumulative summing circuit may further include a second adder 140 and a register 150, wherein a first input terminal of the second adder 140 may be connected to an output terminal of the first adder 130, an input terminal of the register 150 may be connected to an output terminal of the second adder 140, an output terminal of the register 150 may be connected to a second input terminal of the second adder 140, and the register 150 may be configured to return a sum from the second adder 140 to the second adder 140, so that the second adder 140 can perform the accumulative operation. Herein, specific operation manners of the second adder 140 and the register 150 are similar to those of the second adder 140' and the register 150' described with respect to FIG. 1, and details are not described again.

Figure 9:
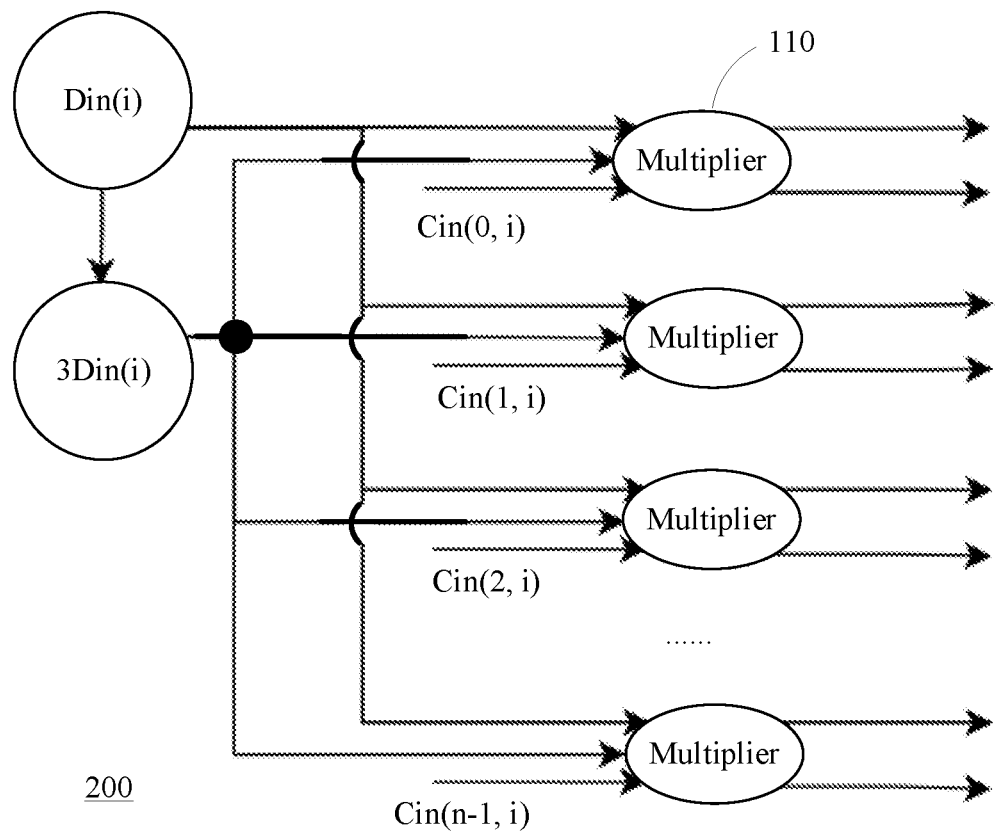
FIG. 9 shows a partial circuit structural schematic diagram of a convolution operation unit according to an exemplary embodiment of the present disclosure.

The present disclosure further provides a convolution operation unit, which may include a plurality of multiply-accumulate circuits as described above. Further, in some embodiments, to increase the parallelism degree of the convolution operation unit, each of the plurality of multiply-accumulate circuits is configured to receive at least one preset multiple of the first operand to perform the multiply-accumulate operation. In an exemplary embodiment, as shown in FIG. 9, each multiplier 110 therein is a corresponding multiplier in a different multiply-accumulate circuit respectively, and other components in each multiply-accumulate circuit are omitted in FIG. 9. It can be learned from FIG. 9 that at least one preset multiple of the first operand (here, two preset multiples of the first operand: Din(i) and 3Din(i)) is jointly input into a corresponding multiplier 110 in each multiply-accumulate circuit, so that the repeated calculation of these two preset multiples of the first operand can be avoided. In particular, the operation process of 3Din(i) is relatively complicated. By pre-calculating and then providing at least one preset multiple of the first operand to each multiplier 110, the convolution operation unit 200 can be effectively simplified. In addition, it may be noted that the first operand herein is the number Din(i) that will be reused by the plurality of equations described above in the convolution operation process.

Figure 10:
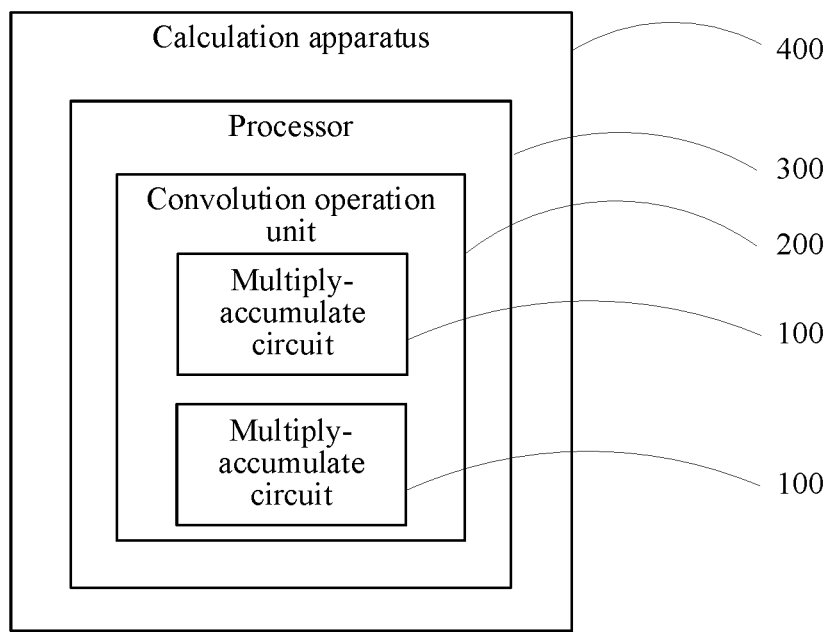
FIG. 10 shows a schematic diagram of a processor and a calculation apparatus according to an exemplary embodiment of the present disclosure.

The present disclosure further provides a processor. As shown in FIG. 10, the processor 300 may include the multiplier 110, the multiply-accumulate circuit 100, or the convolution operation unit 200 as described above. For example, such a processor 300 may be a various processor such as a neural network processor, a central processor, a coprocessor, a digital signal processor, a dedicated instruction processor, and the like.

The present disclosure further provides a calculation apparatus. As shown in FIG. 10, the calculation apparatus 400 may include the multiplier 110, the multiply-accumulate circuit 100, the convolution operation unit 200, or the processor 300 as described above. Examples of the calculation apparatus 400 may include but are not limited to a consumer electronic product, a component of a consumer electronic product, an electronic test device, and cellular communications infrastructure such as a base station. Examples of the calculation apparatus 400 may include but are not limited to a mobile phone such as a smartphone, a wearable computing device such as a smartwatch or a headset, a telephone, a television, a computer monitor, a computer, a modem, a handheld computer, a laptop computer, a tablet computer, a personal digital assistant (PDA), a microwave oven, a refrigerator, an in-vehicle electronic system such as an automotive electronic system, a stereo system, a DVD player, a CD player, a digital music player such as an MP3 player, a radio receiver, a camcorder, a camera such as a digital camera, a portable memory chip, a washing machine, a dryer, a washing machine/dryer, a peripheral device, and a clock. Moreover, the calculation apparatus 400 may include an incomplete product.

In the technical solution of the present disclosure, for the characteristic that one data can be multiplexed by a plurality of convolution formulas in the convolution operation process (that is, data Din(i) can be multiplexed), a plurality of multiply-accumulate circuits can be set, wherein each of the multiply-accumulate circuits may share the multiplexed data to realize the operation in parallel. In addition, in the multiplier included in the multiply-accumulate circuit, by pre-calculating the preset multiple of the operand and selecting the target preset multiple of the operand as the corresponding partial product based on the selection circuit, the traditional multiplier logic can be greatly reduced, thus simplifying the circuit structure, and decreasing the chip area and reducing the power consumption of multiplication operation, and improving the efficiency of neural network processing and reducing cost thereof.

The terms "left", "right", "front", "rear", "top", "bottom", "above", "under", "upper", "lower", and the like in the specification and the claims, if present, are used for a descriptive purpose and are not necessarily used for describing an unchanged relative position. It is to be understood that the words used in such a way are interchangeable in proper circumstances so that the embodiments of the present disclosure described herein, for example, can be operated in other orientations that are different from those shown herein or those described otherwise. For example, when the device in the accompanying drawings is turned upside down, a feature originally described as being "above" another feature may be described as being "under" another feature in this case. The device may alternatively be oriented in other manners (rotated 90 degrees or in other orientations). In this case, a relative spatial relationship will be interpreted correspondingly.

In the specification and the claims, when an element is referred to as being "above" another element, "attached" to another element, "connected" to another element, "coupled" to another element, "in contact" with another element, or the like, the element may be directly above the another element, directly attached to the another element, directly connected to the another element, directly coupled to the another element, or directly in contact with the another element; or one or more intermediate elements may exist. In contrast, when an element is referred to as being "directly above" another element, "directly attached" to another element, "directly connected" to another element, "directly coupled" to another element, or "in direct contact" with another element, no intermediate element exists. In the specification and the claims, a feature being arranged as being "adjacent" to another feature may mean that the feature has a part that overlaps with the adjacent feature or that is located above or under the adjacent feature.

As used herein, the term "exemplary" means "used as an example, instance, or illustration", and not as a "model" to be accurately copied. Any implementation exemplarily described herein is not necessarily to be construed as preferred or advantageous over other implementations. In addition, the present disclosure is not limited by any stated or implied theory provided in the technical field, background, summary, or detailed description.

As used herein, the term "substantially" means that any minor variation caused by a defect of a design or manufacturing, a tolerance of a device or an element, environmental impact, and/or other factors is included. The term "substantially" also allows for a difference from a perfect or ideal situation caused by parasitic effect, noise, and other practical consideration factors that may exist in practical implementation.

In addition, terms like "first" and "second" may also be used herein for a reference purpose only, and therefore are not intended for a limitation. For example, the terms "first", "second" and other such numerical terms relating to a structure or an element do not imply a sequence or an order unless the context clearly indicates otherwise.

It is to be further understood that the term "comprise/include", when used herein, specifies the presence of stated features, integers, steps, operations, units, and/or components, but do not preclude the presence or addition of one or more other features, integers, steps, operations, units, and/or components, and/or combinations thereof.

In addition, when used in this application, the terms "herein", "foregoing", "following", "hereinafter", and "hereinabove" and terms of similar meanings shall refer to the entirety of this application but not any specific part of this application. Moreover, unless otherwise stated clearly or interpreted in other manners in the context used, conditional language such as "may", "can", "for example", and "such as" used herein are usually intended to indicate that some embodiments include certain features, elements, and/or states but other embodiments do not. Therefore, such conditional language are usually not intended to imply that features, elements, and/or states are required in any manner in one or more embodiments, or imply whether these features, elements, and/or states are included, or imply that these features, elements, and/or states are implemented in any specific embodiment.

In the present disclosure, the term "provide" is used broadly for covering all manners of obtaining an object. Therefore, "providing an object" includes but is not limited to "purchasing", "preparing/manufacturing", "arranging/setting", "installing/assembling", and/or "ordering" the object, etc.

As used herein, the term "and/or" includes any and all combinations of one or more of associated listed items. The terms used herein are merely for the purpose of describing specific embodiments but not intended to limit the present disclosure. The singular forms "a", "an", and "the" as used herein are intended to include plural forms as well, unless otherwise clearly stated in the context.

A person skilled in the art should appreciate that the boundaries between the operations as described above are merely illustrative. A plurality of operations may be combined into a single operation, a single operation may be distributed in an additional operation, and operations may be performed at least partially overlapping in time. In addition, alternative embodiments may include a plurality of instances of a specific operation, and an operation order may be changed in various other embodiments. Other modifications, changes, and replacements, however, are also possible. Aspects and elements of all embodiments disclosed above may be combined in any manner and/or combined with aspects or elements of other embodiments to provide a plurality of additional embodiments. Therefore, the specification and the accompanying drawings are to be regarded as illustrative rather than restrictive. In practice, the novel device, method, and system described herein may be embodied in various other forms. Moreover, various omissions, replacements, and changes may be made to the forms of the method and the system described herein without departing from the spirit of the present disclosure. For example, although blocks are shown in a given arrangement, in alternative embodiments, similar functions with different components and/or circuit topologies may be performed, and some blocks may be removed, moved, added, subdivided, combined, and/or modified. Each of these blocks may be implemented in various different manners.

Each embodiment of the present disclosure may be described in a progressive manner. For same or similar parts between each embodiment, can refer to each other. Descriptions of each embodiment focus on a difference from other embodiments. In the present disclosure, descriptions with reference to the term "an embodiment", "some embodiments", "an example", "a specific example", "some examples", or the like mean that specific features, structures, materials, or characteristics described in conjunction with the embodiment or example are included in at least one embodiment or example of the present disclosure. In the present disclosure, exemplary descriptions of the foregoing terms do not necessarily refer to a same embodiment or example. In addition, the described specific features, structures, materials, or characteristics may be combined in proper manners in any one or more embodiments or examples.

Although some specific embodiments of the present disclosure are described in detail by examples, a person skilled in the art is to understand that the foregoing examples are merely used for description, but not for limiting the scope of the present disclosure. Each embodiment disclosed herein may be combined in any combination without departing from the spirit and scope of the present disclosure. A person skilled in the art is to further understand that various modifications may be made to the embodiments without departing from the scope and spirit of the present disclosure. The scope of the present disclosure is defined by the appended claims.

What is claimed is:

1. A convolution operation unit, comprising a plurality of multiply-accumulate circuits configured to run in parallel, wherein each of the plurality of multiply-accumulate circuit is configured to receive a same preset multiple of a same first operand in a same operation period, and each multiply-accumulate circuit comprises:
   a plurality of multipliers configured to run in parallel, wherein each multiplier is configured to perform a multiplication operation between the first operand and a second operand, the second operand is divided into one or more third operands by bit, and each multiplier comprises:
      one or more selection circuits, wherein each of the one or more selection circuits is respectively configured to select a target preset multiple of the first operand from the preset multiple of the first operand as a fourth operand according to a corresponding third operand, the target preset multiple is equal to a value of the third operand; and
      a partial product summing circuit, wherein each of one or more input terminals of the partial product summing circuit is respectively connected to an output terminal of corresponding one of the one or more selection circuits, and the partial product summing circuit is configured to calculate a partial product sum of one or more fourth operands from the one or more selection circuits; and
   an accumulative summing circuit, wherein an input terminal of the accumulative summing circuit is respectively connected to an output terminal of corresponding one of the plurality of multipliers, and the accumulative summing circuit is configured to calculate an accumulative sum of products between a plurality of sets of the first operands and the second operands according to a plurality of outputs from the plurality of multipliers.

2. The convolution operation unit according to claim 1, wherein each selection circuit comprises a multiplexer, the multiplexer comprises a plurality of input terminals, a control terminal, and an output terminal, each of the plurality of input terminals is respectively configured to receive a corresponding preset multiple of the first operand, the control terminal is configured to receive the third operand, and the output terminal is configured to output the fourth operand.

3. The convolution operation unit according to claim 1, wherein each selection circuit comprises a plurality of AND operation units and one OR operation unit, the plurality of AND operation units are disposed in parallel, an output terminal of each AND operation unit is connected to an input terminal of the OR operation unit, two input terminals of each of the plurality of AND operation units are respectively configured to receive the corresponding preset multiple of the first operand and the third operand, and the OR operation unit is configured to output the fourth operand.

4. The convolution operation unit according to claim 1, wherein one partial product summing circuit comprises:
   a first compression tree circuit, wherein each of a plurality of input terminals of the first compression tree circuit is respectively connected to an output terminal of one corresponding selection circuit, and the first compression tree circuit is configured to compress a plurality of fourth operands from a plurality of selection circuits into a plurality of fifth operands, wherein a number of the plurality of fifth operands is less than that of the plurality of fourth operands.

5. The convolution operation unit according to claim 1, further comprising one or more multiple calculation circuits, wherein each of the one or more multiple calculation circuits is respectively configured to calculate a corresponding preset multiple of an operand.

6. The convolution operation unit according to claim 5, wherein one multiple calculation circuit comprises an even multiple calculation circuit, the even multiple calculation circuit comprises a first shifter, the first shifter is configured to move an intermediate operand to left by one bit to generate an even multiple of an initial operand, wherein the intermediate operand is an integer multiple of the initial operand.

7. The convolution operation unit according to claim 5, wherein one multiple calculation circuit comprises an odd multiple calculation circuit, the odd multiple calculation circuit comprises a second shifter and a third adder, the second shifter is configured to move an intermediate operand to left by one bit to generate two multiple of the intermediate operand, and the third adder is configured to add the two multiple of the intermediate operand and an initial operand to generate an odd multiple of the initial operand, wherein the intermediate operand is an integer multiple of the initial operand.

8. The convolution operation unit according to claim 1, wherein a number of selection circuits in the multiplier is a minimum integer greater than or equal to B20/B30, and the one or more selection circuits are respectively configured to receive the one or more third operands in parallel, wherein B20 is a maximum bit number of the second operand and B30 is a maximum bit number of the third operand.

9. The convolution operation unit according to claim 1, wherein the preset multiple of the first operand comprises all integer multiples of the first operand in a range from zero multiple of the first operand to M0 multiple of the first operand, wherein $M0=2^{B3}-1$, and B3 is a bit number of the third operand that is input to a same selection circuit with the preset multiple of the first operand.

10. The convolution operation unit according to claim 1, wherein each of the one or more third operands has a same bit number.

11. The convolution operation unit according to claim 1, wherein a bit number of at least one of the one or more third operands is at least two bits.

12. The convolution operation unit according to claim 1, wherein the accumulative summing circuit comprises:
- a second compression tree circuit, wherein each of a plurality of input terminals of the second compression tree circuit is respectively connected to an output terminal of one corresponding multiplier, and the second compression tree circuit is configured to compress a plurality of sixth operands from the plurality of multipliers into a plurality of seventh operands, wherein a number of the plurality of sixth operands is more than that of the plurality of seventh operands; and
- a first adder, wherein an input terminal of the first adder is connected to an output terminal of the second compression tree circuit, and the first adder is configured to calculate a sum of the plurality of seventh operands.

13. The convolution operation unit according to claim 12, wherein the accumulative summing circuit further comprises:
- a second adder, wherein a first input terminal of the second adder is connected to an output terminal of the first adder; and
- a register, wherein an input terminal of the register is connected to an output terminal of the second adder, an output terminal of the register is connected to a second input terminal of the second adder, and the register is configured to return a sum from the second adder to the second adder, so that the second adder performs an accumulative operation.

14. A processor, comprising the convolution operation unit according to claim 1.

15. A calculation apparatus, comprising the convolution operation unit according to claim 1.

\* \* \* \* \*